United States Patent [19]

Murayama et al.

[11] Patent Number: 4,985,775

[45] Date of Patent: Jan. 15, 1991

[54] ELECTRONIC STILL CAMERA SYSTEM

[75] Inventors: Jin Murayama; Ryuji Kondo, both of Kanagawa, Japan

[73] Assignee: Fuji Photo Film Co., Ltd., Kanagawa, Japan

[21] Appl. No.: 309,924

[22] Filed: Feb. 13, 1989

Related U.S. Application Data

[63] Continuation of Ser. No. 945,987, Dec. 24, 1986, abandoned.

[30] Foreign Application Priority Data

Dec. 26, 1985 [JP]  Japan ................................ 60-292339

[51] Int. Cl.$^5$ ............................................. H04N 3/19
[52] U.S. Cl. ........................... 358/213.13; 358/213.19; 358/909
[58] Field of Search ................... 354/402; 358/213.19, 358/900, 909, 213.31, 213.15, 213.14, 213.24, 213.26, 213.13, 213.18

[56] References Cited

U.S. PATENT DOCUMENTS

| 4,366,501 | 12/1982 | Tsunekawa et al. | 358/906 |
| 4,541,016 | 9/1985 | Ochi et al. | 358/213.19 |
| 4,692,815 | 9/1987 | Kawahara et al. | 358/909 |

Primary Examiner—Michael L. Gellner
Assistant Examiner—David M. Gray
Attorney, Agent, or Firm—Sughrue, Mion, Zinn, Macpeak & Seas

[57] ABSTRACT

An electronic still camera in which every time a solid state pickup element is read out, immediately it is read out again in order to empty out residual charges.

6 Claims, 2 Drawing Sheets

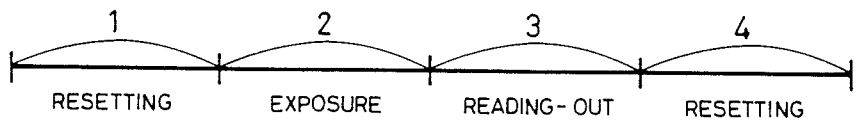
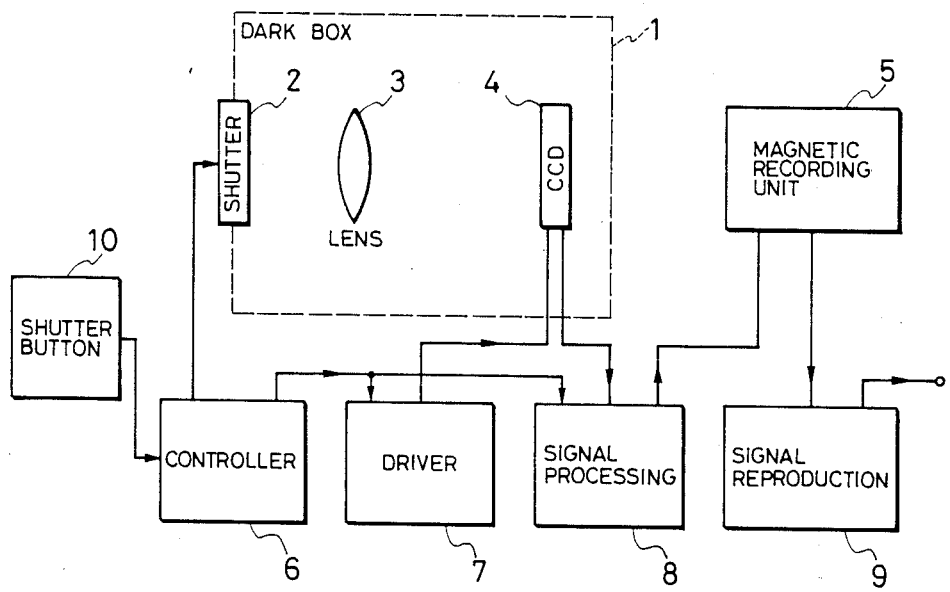

ELECTRONIC STILL CAMERA SYSTEM

This is a continuation of application Ser. No. 06/945,987, filed Dec. 24, 1986, now abandoned.

BACKGROUND OF THE INVENTION

1. Field of the Invention

The present invention generally relates to an electronic still camera system using a solid state image-pickup element. It specifically relates to an electronic still camera system in which a solid state image-pickup element is completely reset before an object is photographed.

2. Background of the Invention

Conventionally, in an electronic still camera using a solid state image-pickup element, it is well known that a reset operation is required for removing all of the residual electric charges in the photodiodes, the smear charges in the transmission path, and the like, by performing an empty read-out operation on the solid state image-pickup element before the shutter is opened.

By the way, when an object is fairly continuously photographed by using such an electronic still camera as described above (succeeding photographs are made at an interval not shorter than a period required for one frame or one field photographing), a significant residual image may remain in some cases depending on the object being photographed so that resetting is insufficient only by the empty reading-out just before initial photographing. With insufficient resetting, the charges which have not been removed are mixed with a succeeding shot to affect the quality of a picture.

In the case where a series of sequences is successively repeated as in a video camera, the above-mentioned problem is reduced. However, it is not suitable to so continously operate an electronic still camera because of the high electrical power required.

SUMMARY OF THE INVENTION

It is therefore an object of the present invention to eliminate the drawbacks in the prior art.

Specifically, it is object of the present invention to provide an electronic still camera system in which a complete reset operation is performed to obtain a high quality picture even in a continuous photographing mode.

In order to attain the above-mentioned objects of the present invention, the electronic still camera system comprises a dark box (camera body), a focusing optical system, a shutter, and a solid state image-pickup element. The camera is operated such that at least one empty read-out operation is performed after reading out signal charges caused by exposure.

Since at least one reset operation is performed after single shot photographing to complete one cycle, residual images before the shot can be removed perfectly. By duplicatively performing such a reset operation after one-shot photographing together with a conventional reset operation just before one-shot photographing, it is possible to much more completely remove signal charges.

Other features and advantages of the invention will be apparent from the following description taken in connection with the accompanying drawings.

BRIEF DESCRIPTION OF THE DRAWINGS

FIG. 2 is a diagram in which the time chart of FIG. 1 is redrawn on a straight line.

FIG. 3 is a block diagram of the camera incorporating the invention.

DESCRIPTION OF PREFERRED EMBODIMENT

Figure 1:
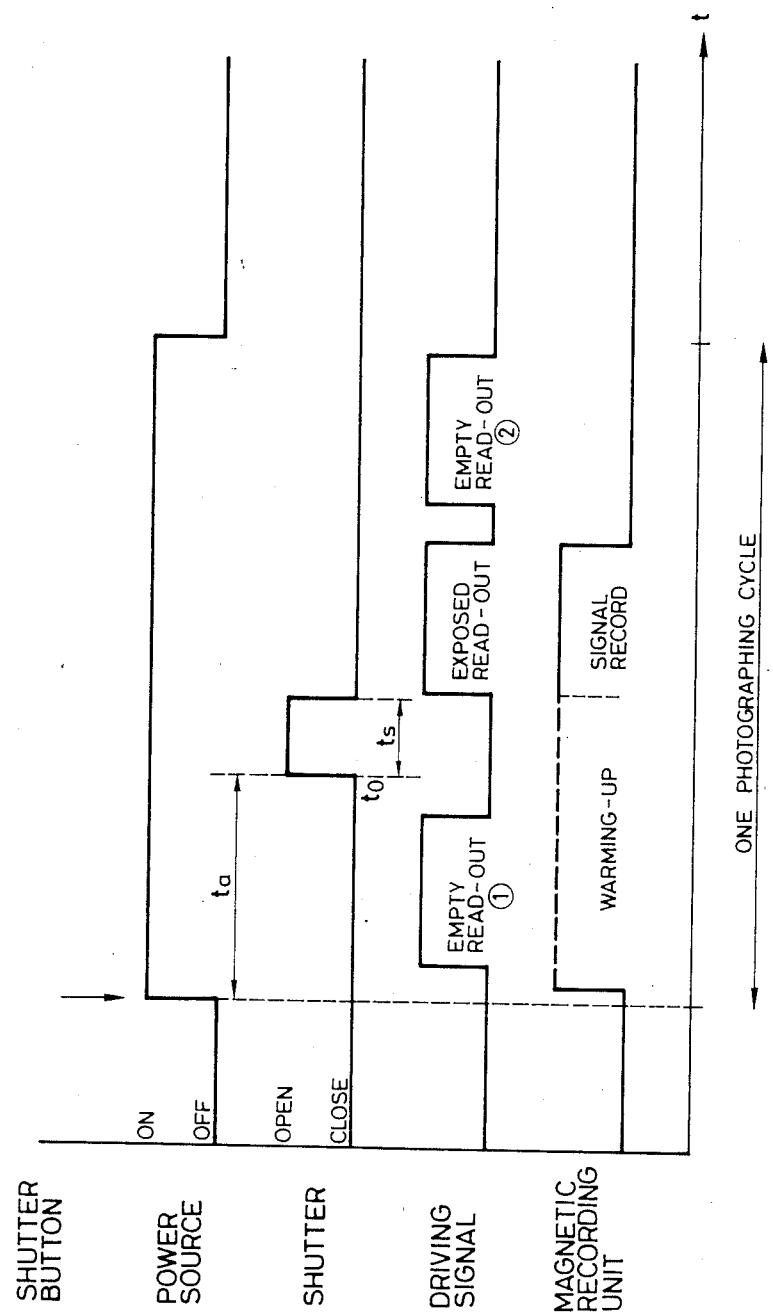
FIG. 1 is a time chart for explaining the system according to the present invention.

Referring to the drawings, an embodiment according to the present invention will be described hereunder.

An electronic still camera according to the present invention is constituted by a dark box, a focusing optical system, a shutter, and a CCD (charge coupled device) having a plurality of CCD elements each forming a charge storage location. FIG. 1 is a time chart for explaining the operation of a camera controlled by the system according to the present invention. In the drawing, the top line shows the on-off state of a power source in a camera operated by a photographer. The middle line shows the operation of a shutter of the camera which is enabled after a predetermined lapse of time $t_a$ after turning on the power source. The shutter is opened at a time $t_o$ and closed after a period $t_s$ has elapsed since the time $t_o$. The bottom line shows the CCD control timing. First, linked with a power source operation, empty reading-out is performed from a predetermined time before the shutter is opened at the time $t_o$, that is, at the time immediately after when the camera power source is turned on by the fact that a shutter button is initially operated by a photographer. That is, residual electric charges from CCD elements in the CCD are discharged in response to a reset signal from a driving element so that the CCD assumes an empty state. The shutter is operated to start actual exposure after termination of the period of the first empty read-out. During the exposure period $t_s$, charges corresponding to a picture are formed and stored in the CCD elements. Thereafter, the CCD is read out in an ordinary manner so that picture signals corresponding to one field are recorded in a magnetic recording media through a signal processing system. Next, the residual charges in the CCD are subjected to empty reading-out in response to a reset signal before completion of the picture being written into the magnetic recording medium by a recording system. A one-shot image-pickup cycle is completed upon completion of the second empty read out. That is, in the electronic still camera system according to the present invention, the image-pickup element is reset immediately after the picture signal reading-out operation, as shown in FIG. 2, to thereby complete a one-shot image-pickup cycle. Immediately after this cycle, succeeding photographing is enabled. It is noted that the timing diagram of FIG. 1 does not exactly correspond to this immediate enablement, as will be described later.

The reset operation after one-shot photographing is not required to be performed at a high speed (usually, about 1/30 second) unlike the empty read-out just before one-shot photographing in the conventional device. Instead, it is sufficient to perform the reset operation before completion of the recording operation, or before completion of recording of one-field even in a continuous photographing mode. Accordingly, the reset operation maybe repeated a number of times, as necessary, so long as the reset operations are performed during this recording period, to thereby completely remove the signal. In the arrangement according to the present invention, there never occurs a missing chance to trigger the shutter exposure due to a waiting time for a reset operation just before a one-shot exposure unlike the conventional device.

FIG. 2 shows the above-mentioned photographing process on a straight line along the time axis, the process including the sequential steps of (1) resetting, (2) exposure, (3) reading-out and (4) resetting. The first resetting (1) in the drawing is performed only when the power source is turned on, and is not performed in succeeding operations. The respective lengths of the steps shown in the drawing do not show relative time proportions.

Further, in the above-mentioned embodiment, a CCD is used as a solid state photographing element. However, it is apparent that the present invention is not limited to this type of imaging element.

As a second embodiment according to the present invention, a residual image can be removed completely by means of an arrangement in which the conventional reset operation immediately before a one-shot exposure is performed in combination with the reset operation after another one-shot exposure. In this case, however, the reset operation before the one-shot exposure must be performed at high speed like the conventional device, so that the reset operation before one-shot exposure is restricted to a continuous mode.

FIG. 3 is a block diagram showing the overall arrangement of the electronic still camera system. A brief description of FIG. 3 will be given below with reference to the timing chart of FIG. 1.

When a shutter button 10 is depressed, the power source is turned ON and a series of operations is commenced under the control of a controller 6. Next, a switch of a disk motor in a magnetic recording unit 5 is turned ON for warming-up the magnetic recording unit 5. Simultaneously, the empty read-out operation of a CCD 4 is performed under the immediate control of a CCD driver 7. The empty read-out operation is similar to the exposed read-out operation except that the output signal is not recorded during the empty read-out. The driving signal from the CCD driver 7 is not different when it is applied during the empty read-out and during the exposed read-out. After the empty read-out operation has been performed, a shutter 2 is held open for a predetermined exposure time period. Immediately after the shutter 2 is closed, the CCD 4 is driven to deliver the exposed image signals to a signal processor 8 for recording in the magnetic recording unit 5. When the signal recording for one frame or one field has ended, then the empty read-out of the CCD 4 is performed. Thereafter, the power source for the system is turned OFF after a fairly long stand-by period. When the shutter button 10 is depressed again during the stand-by period, the exposure and image recording can be immediately performed without the necessity of an empty read out following the button depression. This first embodiment requires a somewhat different timing than that shown in FIG. 1 but conforms to the general timing diagram of FIG. 2. The control is effected in the controller 6.

In the second embodiment, the first empty read out is repeated during consecutive shooting. In this case, the power is turned off, as shown in FIG. 1, immediately after the second empty read out. In this case, therefore, the power is turned on whenever the shutter button 10 is pushed, even in consecutive photography. Therefore, the empty read out before the exposure is always performed. Therefore, there must be provided sufficient time between consecutive exposures to allow time for the two empty read outs.

As described above, in an electronic still camera system, the resetting operation of a solid state image-pickup element is performed at least once after exposure so as to completely remove the residual charges in a preceding cycle before succeeding exposures to thereby make it possible to perform proper photography. Further, one exposure cycle is completed upon completion of a reset operation after a one-shot exposure, so that a shutter chance is not missed even in a continuous photographing mode. Further, according to the present invention, an interval between a first and a second one-shot exposure may be long. However, the interval is acceptable when the interval is not longer than ten seconds.

What is claimed is:

1. An electronic still camera system, comprising:
   a dark box;
   a focusing optical system in said box;
   a solid-state image-pickup in said dark box having a plurality of charge storage elements;
   a shutter in said dark box selectively passing light through said focusing optical system to said solid-state image-pickup element;
   reading means for performing a first read operation for reading out for recordation signals from predetermined elements of said solid-state image-pickup following an exposure thereof by said shutter, said reading means performing a second read operation for reading out residual charge from said predetermined elements of said solid-state image-pickup a predetermined time after said first read operation prior to a next exposure of said solid-state image-pickup element, said shutter remaining closed during said predetermined time.

2. An electronic still camera system as recited in claim 1, wherein said reading means completes its second read operation at a time no later than approximately 1/30 second following said first read operation.

3. An electronic still camera system as recited in claim 1, further comprising;
   a shutter switch controlling said shutter; and
   wherein said reading means performs a third read operation for reading out residual charge from said elements of said solid state image-pickup a first predetermined time after an operation of said shutter switch and before an opening of said shutter.

4. An electronic Still camera as recited in claim 3, wherein said reading means performs said third read operation at a first operation of said shutter switch but not at a second operation of said shutter switch within a second predetermined time after said first operation of said shutter switch.

5. An electronic still camera as recited in claim 3, wherein said reading means performs said third read operation at every operation of said shutter switch.

6. An electronic still camera system as recited in claim 3, further comprising:
   a magnetic recording medium; and
   recording means for recording signals from said first reading means into said magnetic recording medium; and
   wherein said reading means completes said third read operation before a completion of a corresponding operation of said recording means.

* * * * *